Jan. 6, 1942.　　　　P. C. READ　　　　2,268,900
BOTTLE WASHER
Filed Sept. 19, 1940　　　2 Sheets-Sheet 1

9892-2

Inventor
Philip C. Read

Jan. 6, 1942. P. C. READ 2,268,900
BOTTLE WASHER
Filed Sept. 19, 1940 2 Sheets-Sheet 2

9892-2

Inventor
Philip C. Read

Patented Jan. 6, 1942

2,268,900

UNITED STATES PATENT OFFICE 2,268,900

BOTTLE WASHER

Philip C. Read, Shorewood, Wis., assignor to Dostal & Lowey Co., Inc., Menomonee Falls, Wis., a corporation of Wisconsin Application September 19, 1940, Serial No. 357,341

6 Claims. (Cl. 141—7)

This invention relates to bottle washers and more particularly to washers of the soaker-hydro type.

These washers effect cleaning and sterilization of bottles by a combination of soaking in caustic solution to loosen foreign materials from the bottles, and thereafter high-pressure spraying of caustic solution into the interiors of bottles as well as the exteriors thereof. Such treatment is, of course, followed by a clean water rinse.

Washers of this type generally employ an endless conveyor having its stretches arranged horizontally lengthwise of the housing of the washer with the bottom stretch of the conveyor immersed in the hot caustic solution in the soaker tank at the bottom of the housing and the top or uppermost stretch thereof arranged to travel above the level of solution in the housing.

The conveyor is provided with carrier bars, preferably of the type which grip and hold bottles by their necks and which conduct the bottles to be cleansed into the alkali solution at one end of the conveyor with their mouths uppermost so that the bottles are soaked as the preliminary cleaning operation during their travel on the lower stretch of the conveyor.

The bottles are lifted out of the caustic solution at the opposite end of the conveyor for travel to the unloading station, which is usually adjacent to the first-mentioned end of the conveyor, in an inverted position so that solution drains therefrom.

During their travel to the unloading station, the soaked bottles have their interiors as well as their exteriors subjected to high-pressure spraying of caustic solution to dislodge all loosened foreign material from the bottles. Immediately before being unloaded, the bottles are sprayed interiorly and exteriorly with fresh water rinses to wash away the caustic solution therefrom.

Inasmuch as the bottles are held in an inverted position during their travel on the top stretch of the conveyor, the spray means for the interiors of the bottles which are of the high-pressure rising jet type must be located beneath the top stretch of the conveyor, and the nozzles thereof are consequently subject to clogging by labels and other foreign material washed from the bottles by the external spray means located above the top stretch of the conveyor, or by solid substances in the liquid passing through the nozzles.

When such a condition occurred, it was necessary to either dismantle a considerable portion of the washer housing to provide access to the nozzle header for its removal and cleaning, or to reach into the crowded interior of the washer through suitable doorways therein to clean the nozzles while the headers remained in place. Consequently, considerable time and effort was required to clean the jets of the nozzle headers located beneath the top stretch of the conveyor.

The present invention, therefore, has as its primary object the provision of rising jet nozzle headers for a bottle washer of the character described which are readily removed from the housing of the washer for inspection or cleaning through an opening in the side wall of the housing.

More specifically, this invention contemplates the provision of a bottle washer having a rising jet nozzle header mounted for pivotal motion beneath the top stretch of the conveyor for swinging motion in a plane substantially parallel to the stretches of the conveyor from an operative position beneath the mouths of the inverted bottles on the top stretch of the conveyor to an inoperative cleaning position exteriorly of the housing of the washer through an opening in one side wall of the housing.

A further object of this invention is to provide a bottle washer of the character described with a nozzle header mounted for pivotal motion to and from an operative spraying position with respect to the bottles conducted through the washer by the conveyor without necessitating disconnection of the header with its source of liquid under pressure.

Inasmuch as the nozzles of the rising jet spray header which effect washing or rinsing of the bottle interiors with fresh water are also subject to clogging, this invention has as another of its objects to provide for quick removal of the fresh water rising jet header through an opening in the side wall of the housing for inspection and cleaning of the nozzles of the same.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate two complete examples of the physical embodiment of the invention constructed in accordance with the best modes so far devised for the practical application of the principles thereof, and in which.

Figure 1:
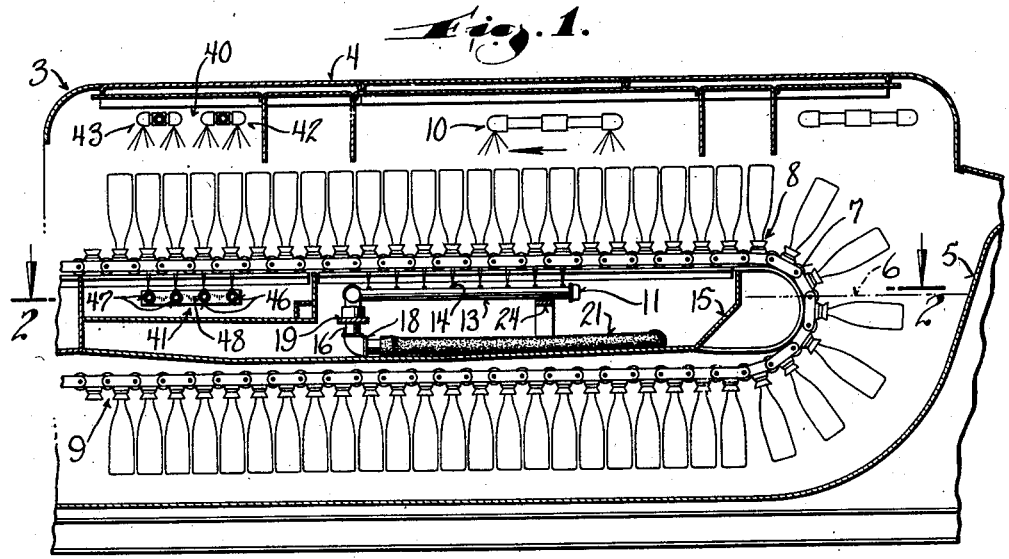
Figure 1 is a longitudinal sectional view through a portion of the bottle washing machine illustrating the application of this invention thereto.

Referring now particularly to the accompanying drawings, in which like numerals indicate like parts throughout the several views, the numeral 3 designates a conventional washer of the soaker hydro type, only a portion of which is shown. The housing 4, is in the form of an elongated enclosure, and has a soaker tank 5 in its bottom adapted to hold a supply of caustic alkali solution to the level designated by the broken line 6.

An endless conveyor 7 is mounted inside the housing and is provided with the usual bottle carrier bars extending transversely of the conveyor, which, preferably, grip bottles by their necks and hold the same so that their mouths face each other on opposite stretches of the conveyor. The conveyor is positioned horizontally within the housing so that its top stretch 8 travels in a plane spaced above the level 6 of solution in the tank and so that its lower stretch 9 is immersed in the solution.

As viewed in Figure 1, the direction of travel of the conveyor is such that the bottles immersed in the solution travel toward the right, and are lifted out of the solution as the conveyor reverses to be held in an inverted position at the top stretch of the conveyor for travel toward the left in the direction of the arrow to the unloading station, not shown.

During reversing of the travel of the bottles, and as they are brought to their inverted position, all of the caustic solution is emptied therefrom, and they are caused to pass between a plurality of spray headers having jets arranged to spray liquid under substantially high pressure both on the exterior of the bottles and the interiors thereof.

The first set of such headers, between which the bottles are conducted, is supplied with a caustic solution similar to the solution in the soaker tank and comprises an upper header unit 10 and a lower header unit 11 of the rising jet type. The header unit 10 is of conventional type and consists merely in two pipes connected with a common source of caustic solution, extending transversely across the housing and having a plurality of nozzles, not shown, in their undersides to completely spray the exteriors of the bottles carried by the carrier bars of the conveyor.

The header unit 11, however, due to its position beneath the inverted bottles, is subject to the effects of foreign material cleansed from the bottles such as labels, etc., and which frequently effect clogging of the nozzles thereof.

Figure 2:
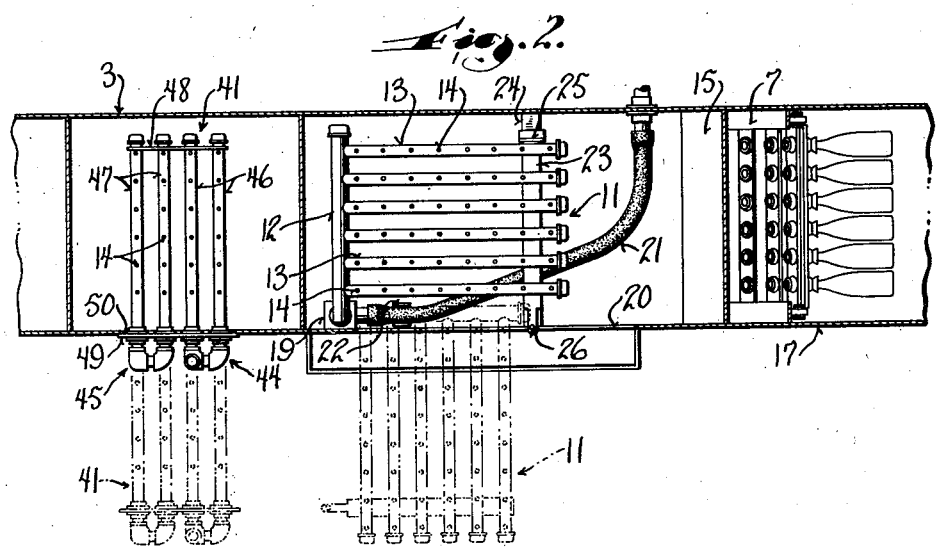
Figure 2 is a sectional view through Figure 1, taken on the plane of the line 2—2.
Figure 3:
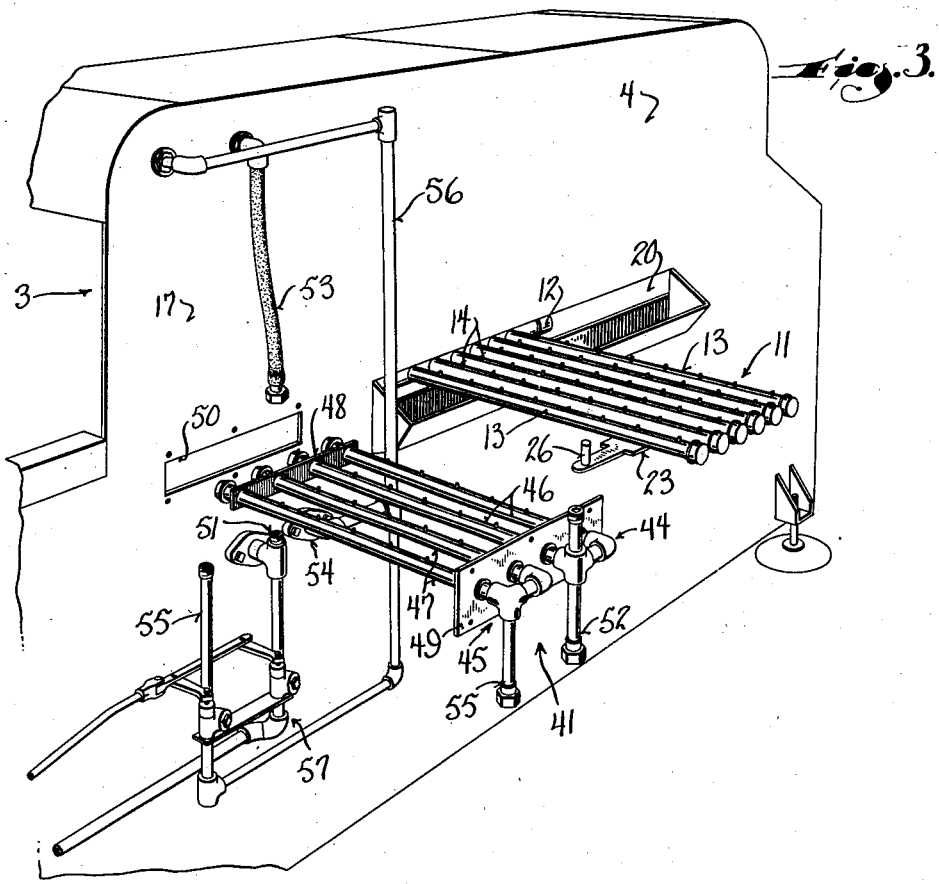
Figure 3 is a perspective view illustrating the manner in which the rising jet spray headers are moved to their inoperative positions exteriorly of the washer.

For this reason, the header unit 11 is of special construction to permit the same to be moved from its position immediately beneath the top stretch of the conveyor to a position exteriorly of the washer as indicated in Figure 3, and in dotted lines in Figure 2.

The caustic header unit 11 consists of a transverse horizontal terminal header member 12 having connected thereto one end of a number of nozzle headers 13. The nozzle headers 13 are disposed in predetermined spaced relationship so as to be spaced apart a distance equal to the transverse spacing of the bottles on the conveyor when the header is in operative position beneath the bottles, and one such nozzle header is provided for each longitudinal row of bottles conducted through the washer by the conveyor. The nozzles 14 of the nozzle headers have longitudinal spacing equal to the space between transverse rows of bottles on the conveyor so that the interior of each bottle may receive a forceful spray of caustic solution from the nozzles of the header unit 11 as they pass thereover.

The solution sprayed by the headers 10 and 11 is maintained separately of the solution 6. For this purpose, a tank 15 is provided between the conveyor stretches with its bottom beneath the header units 10 and 11.

The header unit 11 is movably supported in the tank 15 by means of a nipple 16 fixed in a vertical position to the underside of the terminal header member 12 at one end thereof adjacent to one of the side walls 17 of the housing, and which carries a pipe fitting such as an elbow 18 threaded on its lower end and resting on the bottom wall of the tank 15. The threaded connection between the nipple and elbow is substantially loose to permit relative rotation of the connected header unit and nipple with respect to the elbow.

The nipple 16 is journalled in a bearing 19 carried by the side wall 17 of the housing and which constrains movement of the header to bodily swinging motion on a vertical axis adjacent to the side wall 17 of the housing.

Thus the header 11 may be swung horizontally from its operative position in which the nozzle headers 13 extend longitudinally of the housing beneath the top stretch of the conveyor to an inoperative position exteriorly of the machine as illustrated in Figures 2 and 3 through an opening 20 in the side wall 17 of the housing.

The elbow 18 remains substantially stationary during such swinging motion of the header unit due to the friction between it and the bottom wall of the tank 15. A supply line 21 is connected with the elbow to supply caustic solution to the header unit, and also aids in holding the elbow against rotation during pivotal motion of the header unit. As it is preferable that the supply line be formed of rubber, a clamp 22 carried by the bottom wall of the tank 15 is arranged to grip the rubber hose directly adjacent to its connection with the elbow.

To insure accurate positioning of the header unit 11 inside the housing, the undersides of the free ends of the nozzle headers 13 remote from their connection with the terminal header member 12 are joined by a crossbar 23 adapted to rest on a transverse support 24 fixed inside the housing, and which carries a stop 25 engaged by the inner end of the crossbar 23. The nozzle headers 13 are thus readily aligned with the longitudinal rows of bottles carried by the conveyor, by means of the stop 25 which limits pivotal motion of the header unit to its operative position inside the housing after inspection of the nozzles thereof.

The support 24 also prevents sagging of the outer end of the nozzle headers as will be apparent.

For convenience in inspecting the nozzles, the crossbar 23 is provided with a handle 26 at its outer end which is located directly adjacent to the opening 20 when the header 11 is in its operative position within the housing. Thus, for inspection of the header 11, the operator grasps the handle 26 after shutting off the supply of caustic solution to the header and swings the entire header unit outwardly through the opening 20 to the position illustrated in Figures 2 and 3, where all of its nozzles may be inspected and cleaned.

As will be readily apparent, such inspection requires but a minimum of time, as it is unnecessary for the operator to partially dismantle the housing to gain access to the header.

Figure 4:
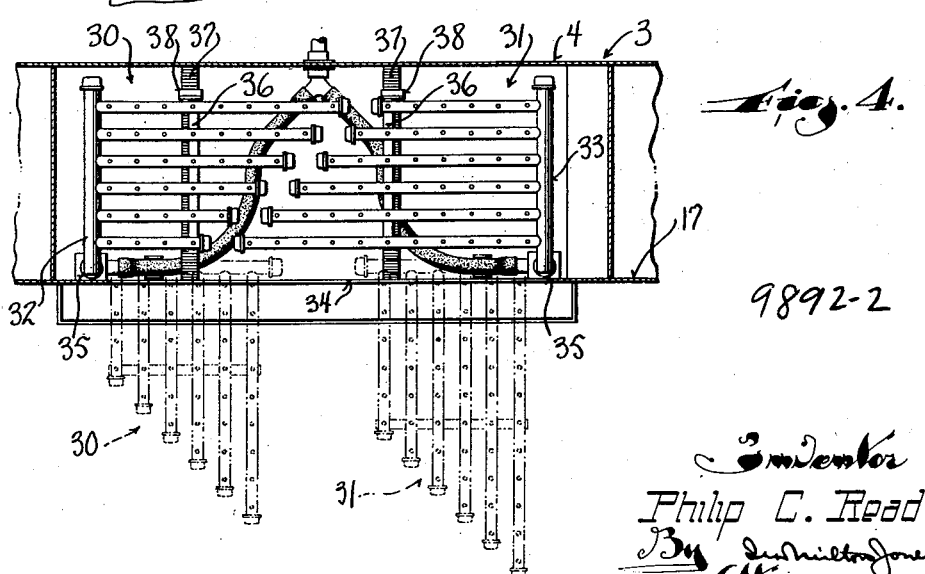
Figure 4 illustrates a slightly modified arrangement of the caustic rising jet spray headers.

If it is desired that the caustic solution rising jet header unit be provided with more nozzles, a modified construction such as illustrated in Figure 4 may be used to advantage.

In this form of the invention, the rising jet caustic spray header unit comprises two pivotally mounted header sections 30 and 31 each similar to the header unit 11 described in Figures 1 to 3, inclusive, but having nozzle headers of varying lengths, although they may be of equal length if preferred.

As clearly seen in Figure 4, each of these sections includes transverse terminal header members 32 and 33 having their ends adjacent to the enlarged opening 34 in the side wall 17 of the housing pivotally connected as at 35 in the manner described in connection with the header unit of Figure 1.

The nozzle headers of each section are joined to the terminal header members in the same manner as hereinbefore described and project toward each other longitudinally of the housing so as to substantially span the space between the terminal headers.

As stated, however, the nozzle headers are of varying lengths, with the longest nozzle header of the section 30 at the side of the housing opposite the opening 34. The remaining nozzle headers of this section decrease in length progressively toward the opening 34.

The longest nozzle header of the section 31 is adjacent to the opening 34, and the remaining nozzle headers thereof progressively decrease in length toward the side of the housing opposite the opening 34.

Thus, when it is desired to inspect or clean the nozzles of the units, both sections are simultaneously swung on their pivots 35 to positions exteriorly of the housing as illustrated in construction lines, through the opening 34 in the side wall thereof.

As in the previous embodiment, each of the sections 30 and 31 has a crossbar 36 connecting the undersides of the nozzle headers and adapted to rest on a transverse support 37 inside the housing when the sections are in their operative positions. The inner ends of the crossbars 36 likewise engage stationary stops 38 carried by the supports 37 to accurately position the nozzle headers and insure alignment thereof with the longitudinal rows of bottles carried by the conveyor.

After the bottles on the top stretch of the conveyor pass the rising jet caustic spray header or headers, they are conducted between fresh water spray header units 40 and 41 at the top and underside of the bottles respectively.

The top header unit is composed of two sections, 42 and 43, for warm and cold water, respectively. Thus the bottles first are brought beneath the warm water section 42 to effect a gradual cooling thereof, inasmuch as the caustic spraying headers are adapted to have hot solution sprayed onto the bottles.

The spray unit 41 likewise comprises two sets of headers, 44 and 45, each comprising two nozzle headers 46 and 47 respectively for warm and cold water. The nozzle headers 46 and 47 are carried by end plates 48 and 49 at their inner and outer ends respectively so that the nozzle headers lie transversely of the conveyor and are spaced apart a distance equal to the spacing between transverse rows of bottles on the conveyor.

The end plate 49 overlies the exterior wall 17 of the housing and closes an opening 50 therein through which the unit 41 may be withdrawn upon disconnecting the headers from their sources of water as illustrated in Figure 3.

As clearly shown in this figure, the outer ends of the nozzle headers 46 projecting outside the housing through the plate 49 are connected with a source 51 of warm water by means of pipe connections 52, which also connect the header section 42 above the bottles with the source 51 through a hose 53.

The nozzle headers 47 are connected with the cold water source 54 by a pipe connection 55. The header section 43 of the upper spray header is also connected to the cold water source 54 through a pipe connection 56.

Thus, when it is desired to remove the rising jet fresh water spray header unit 41 from the housing, it is only necessary to shut off the water supply to the nozzle headers by means of a valve arrangement 57, remove the screws which secure the end plate 49 to the side wall 17 of the housing, and disconnect the nozzle headers 46 and 47 by means of the pipe connections 52 and 55 from their sources of water and draw the unit out from the housing through the opening 50 in the side wall 17 thereof.

It will be seen, therefore, that the rising jet spray units 41 may be removed with considerable less expenditure of time and effort than in past devices wherein portions of the housing had to be removed to provide access to the stationary mounted header units.

From the foregoing description taken in connection with the accompanying drawings, it will be readily apparent that this invention enables a considerable saving in time and effort through the novel manner of mounting the header units for ready removal from the housing of the washer and thereby enables more frequent inspection and cleansing of the nozzles to insure efficient cleaning of the bottles.

What I claim as my invention is:

1. In a bottle washer of the character described: a housing having top and bottom walls connected by straight side walls to define a treatment zone through which bottles to be cleansed are conducted along a defined substantially horizontal path; a horizontal nozzle header unit in said housing adjacent to said treatment zone having a plurality of nozzles arranged to spray liquid toward the bottles being conducted through said treatment zone; and means wholly inside the housing for pivotally mounting said nozzle header unit from the housing for swinging movement thereof in a plane substantially parallel to the path of travel of the bottles from an operative spraying position within said treatment zone to an inoperative position exteriorly of the housing through a cut out portion in one of the side walls of the housing, said means including a nipple having one end connected with the nozzle header unit and its other end connected with a source of liquid.

2. In a bottle washer of the character described: a housing having top and bottom walls connected by straight side walls, and having means for conducting inverted bottles in transverse rows longitudinally through the housing on a substantially horizontal plane; a nozzle header unit disposed horizontally in the housing beneath the mouths of the inverted bottles and having a plurality of transverse rows of nozzles arranged to spray liquid under pressure up into the mouths of the bottles conducted past the header units; means inside the housing connected to the nozzle header unit for conducting fluid under pressure to said header unit and consequently the nozzles thereof, said means including a nipple fixed at one end to the header unit so as to depend vertically therefrom adjacent to one side wall of the housing, and a fitting threaded substantially loosely on the other end of the nipple so as to permit a degree of relative rotation of the nipple with respect thereto and resting on a part on the interior of the housing; and means on the inner side of said side wall providing a bearing to rotatably receive a portion of the nipple, whereby the header unit may be swung on the vertical axis of the nipple to an inoperative position exteriorly of the housing through an opening cut in said side wall of the housing for inspection and cleaning of the nozzles of the header unit.

3. In a bottle washer of the character described: a housing having top and bottom walls connected by straight side walls one of which is provided with an opening, and having means for conducting inverted bottles in transverse rows longitudinally through the housing on a substantially horizontal plane and at a level above that of said opening; a nozzle header unit disposed horizontally in the housing beneath the mouths of the inverted bottles and in alignment with said opening, said nozzle header unit having a plurality of transverse rows of nozzles arranged to spray liquid under pressure up into the mouths of the bottles conducted past the header unit; means for conducting fluid under pressure to said header unit and consequently the nozzles thereof, said means including a nipple fixed at one end to the header unit so as to depend vertically therefrom adjacent to the inner side of said side wall of the housing having the opening, and a fitting threaded substantially loosely on the other end of the nipple so as to permit a degree of relative rotation of the nipple with respect thereto and resting on a portion on the interior of the housing; means on the interior of the housing providing a bearing to rotatably receive a portion of the nipple, said last-named means constraining the header unit to bodily swinging movement on the vertical axis of the nipple through said opening to and from an operative spraying position inside the housing; and means in the housing engaged by the nozzle header unit and cooperating with said fitting threaded on the nipple to properly support the nozzle header unit within the housing in alignment with said 4. In a bottle washer of the character described: a housing having top and bottom walls connected by straight side walls one of which is provided with an opening, and having means for conducting bottles in transverse rows therethrough on a substantially horizontal plane and at a level above that of said opening; opposed nozzle header units disposed horizontally in the housing in alignment with said opening, each having a plurality of transverse rows of nozzles arranged to spray liquid under pressure toward the bottles conducted past the units; and means for pivotally mounting each of said nozzle header units for bodily swinging motion on a vertical axis inside the housing and adjacent to one end of said opening for movement from operative spraying positions inside the housing to inoperative positions exteriorly of the housing through said opening, said means including a nipple for each of the nozzle header units connected at one end to said nozzle header units and having their opposite ends connected with a source of liquid.

5. In a bottle washer of the character described: a housing having top and bottom walls connected by straight side walls one of which is provided with a longitudinally elongated opening, and having means for conducting inverted bottles in transverse rows longitudinally through the housing on a substantially horizontal plane and at a level above that of said opening; a header unit disposed horizontally in the housing in alignment with said opening, said header unit comprising a transverse terminal header member having its end opposite said opening closed, a plurality of longitudinal nozzle headers connected at one end to said terminal header member so as to be supplied with fluid therefrom and each having nozzles arranged to spray liquid under pressure into the mouths of bottles conducted past the header unit, and a vertical tubular extension at the other end of the terminal header member adjacent to the inner side of said side wall and one of the longitudinal limits of the opening therein; a bearing on the inner side of said side wall of the housing rotatably receiving said vertical extension of the terminal header member to provide for swinging of the header unit on a vertical axis interiorly of the housing from its operative position within the housing through said opening to an inoperative position exteriorly of the housing at which the nozzle headers may be inspected and cleaned; and means connecting the end of the vertical extension opposite the terminal header member with a source of fluid under pressure.

6. In a bottle washer of the character described: a housing having top and bottom walls connected by straight side walls one of which is provided with a longitudinally elongated opening, and having means for conducting inverted bottles in transverse rows longitudinally through the housing on a substantially horizontal plane and at a level above that of said opening; a header unit disposed horizontally in the housing in alignment with said opening, said header unit comprising a transverse terminal header member having its end opposite said opening closed, a plurality of longitudinal nozzle headers connected at one end to said terminal header member so as to be supplied with fluid therefrom and each having nozzles arranged to spray liquid under pressure into the mouths of bottles conducted past the header unit, and a vertical tubular extension at the other end of the terminal header member adjacent to the inner side of said side wall and one of the longitudinal limits of the opening therein; a bearing on the inner side of said side wall of the housing rotatably receiving said vertical extension of the terminal header member to provide for swinging of the header unit on a vertical axis interiorly of the housing from its operative position within the housing through said opening to an inoperative position exteriorly of the housing at which the nozzle headers may be inspected and cleaned; and means connecting the end of the vertical extension opposite the terminal header member with a source of fluid under pressure, said last named means including a flexible conduit.

PHILIP C. READ.

CERTIFICATE OF CORRECTION.

Patent No. 2,268,900.

January 6, 1942.

PHILIP C. READ.

It is hereby certified that error appears in the printed specification of the above numbered patent requiring correction as follows: Page 4, first column, line 58, claim 3, after "said" insert --opening.--; and that the said Letters Patent should be read with this correction therein that the same may conform to the record of the case in the Patent Office.

Signed and sealed this 17th day of February, A. D. 1942.

(Seal)

Henry Van Arsdale,
Acting Commissioner of Patents.